United States Patent [19]

Kita et al.

[11] Patent Number: 5,506,637
[45] Date of Patent: Apr. 9, 1996

[54] BRIDGE STRUCTURE OF SPECTACLES FRAME

[75] Inventors: Akihiro Kita; Yoshio Chikama, both of Fukui, Japan

[73] Assignee: Kabushiki Kaisha Erica Optical, Fukui, Japan

[21] Appl. No.: 287,425

[22] Filed: Aug. 9, 1994

[30] Foreign Application Priority Data

Feb. 26, 1994 [JP] Japan ..................... 6-053048

[51] Int. Cl.⁶ ..................... G02C 5/06
[52] U.S. Cl. ..................... 351/126; 351/124; 351/128
[58] Field of Search ..................... 351/128, 126, 351/124, 125, 129, 133, 45, 65, 67, 68, 70, 64, 227; 2/445, 454

[56] References Cited

FOREIGN PATENT DOCUMENTS 2559279  8/1985  France ..................... 351/158

Primary Examiner—William L. Sikes
Assistant Examiner—Hung Xuan Dang
Attorney, Agent, or Firm—Nikaido Marmelstein Murray & Oram

[57] ABSTRACT

Disclosed is an improved bridge structure of spectacles frame, which frame has a bridge and a transverse piece both connecting two rims side by side. It comprises a joint piece and opposite arms, each arm being fixed to one or the other rim at one end, and being fixed to the joint piece at the other end so as to permit the arms to rotate relative to each other. The rotatable bridge permits the frame to yielding twist when exterior force is applied thereto, and to restore to its original shape when the exterior force is removed therefrom.

2 Claims, 3 Drawing Sheets

BRIDGE STRUCTURE OF SPECTACLES FRAME

BACKGROUND OF THE INVENTION

1. Field of the Invention

The present invention relates to a frame of spectacles, and more particularly a bridge structure of the spectacles frame, which bridge structure is so designed that the frame can be yieldingly twisted, returning to its original shape after the twisting force is removed.

2. Description of Related Art

Recently frames of spectacles have been made of shape memory alloys or super resilient materials, thereby increasing their resistance to perpetual deformation, which may be caused for instances by inadvertently putting one's foot or something else down on the spectacles. Such anti-deformation frames, however, are expensive.

FIG. 6 shows a conventional frame. It includes a bridge 2, a transverse piece 3 both connecting two rims 1 side by side and nose pads 7. Each rim 1 is connected to an associated temple 5 via a hinge 6, which is fixed to the rim-to-temple joint 4 of the rim 1. The transverse piece 3 has the effect of substantially increasing the rigidity of the frame, but it adversely reduces the resistivity of the frame to deformation. The frame having no transverse piece can often restore to its original shape when external force is removed, but the transverse piece prevents the deformed frame to restore to its original shape, and sometimes the transverse-to-rim soldering is broken to cause the transverse piece to leave off from the rim when the deformed frame is forced to restore to its original shape by hand.

SUMMARY OF THE INVENTION

One object of the present invention is to provide a bridge structure of the frame of spectacles, which frame has a bridge and a transverse piece both connecting two rims side by side, increasing the resistance to perpetual deformation caused by twisting without using expensive shape memory alloys or super resilient materials.

To attain this and other objects according to the present invention a bridge structure is composed of two or three pieces including a joint and opposite arms. Each arm is fixed to one or the other rim at one end, and being fixed to the joint piece at the other end so as to permit the arms to rotate relative to each other but to prevent them from being separate from each other.

According to one aspect of the present invention the joint piece may be a tubulous member comprising a relatively large diameter hollow section and a relatively large diameter hollow section with an annular stepwise transition appearing from the large to small diameter hollow section. One arm may have an expanded end large enough to be caught by the annular stepwise transition in the tubulous member, thus preventing the slippingoff of the one arm from the joint piece, and permitting rotation of the one arm in the tubulous member. The other arm may be inserted in and soldered to the relatively large diameter end of the tubulous member.

As for a two-piece bridge structure one arm and the joint piece may be of an integral form. The joint piece may be a tubulous member having threads formed inside, and the other arm may have threads formed at its one end, and may be threadedly engaged with the tapped tubulous member. Alternatively the tubulous joint may have no threads formed inside, and the other arm may have an enlarged end. The arm may be rotatably connected to the tubulous joint by caulking its open edge around the enlarged head of the arm.

With these arrangements the arms can be responsive to twisting for rotating relative to each other, thereby permitting the frame to yieldingly deform, and restore to its original shape when the twisting force is removed.

Other objects and advantages of the present invention will be understood from the following description of preferred embodiments, which are shown in accompanying drawings:

DESCRIPTION OF THE PREFERRED EMBODIMENTS

Figure 1:
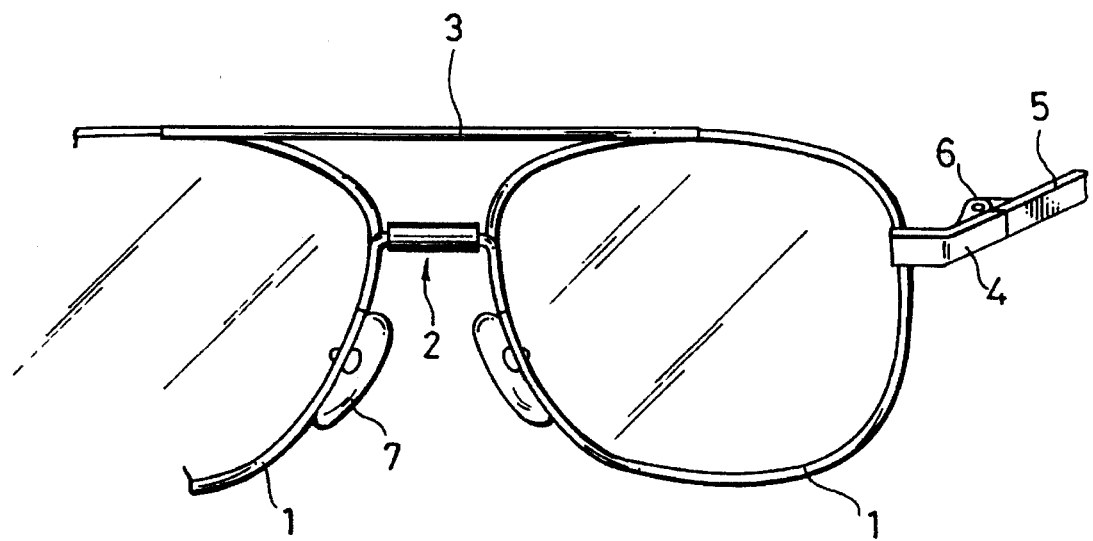
FIG. 1 is a frame of spectacles having a transverse piece and a bridge both connecting two lenses side by side.
Figure 6:
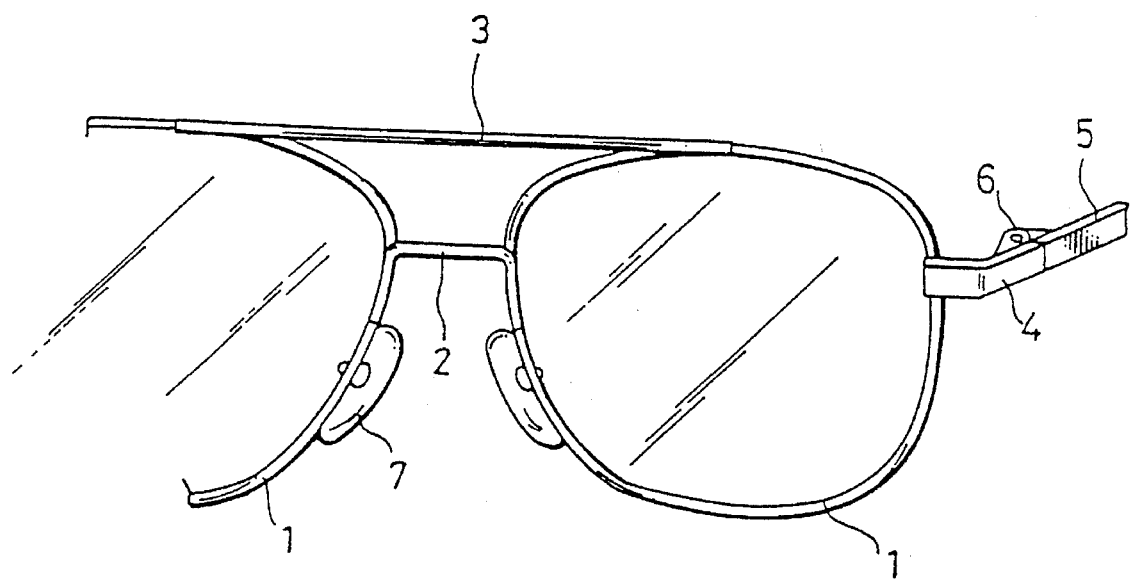
FIG. 6 is a conventional frame of spectacles having a transverse piece and a bridge both connecting two lenses side by side.

Referring to FIG. 1, a frame of spectacles having a bridge structure according to the present invention appears to be similar to the conventional frame structure of FIG. 6 as a whole. The rim 1 is shown as a closed curve, but it may be an upper curved metal-and-lower invisible yarn rim to encircle the lens.

Figure 2:
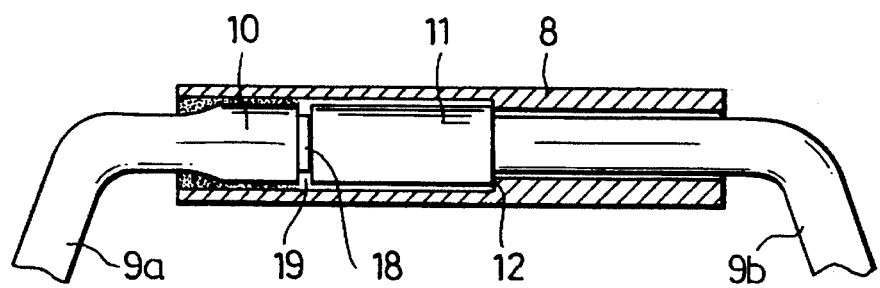
FIG. 2 is a longitudinal section of a three-piece bridge structure according to a first embodiment of the present invention.

The transverse piece 3 traverses above the bridge 2, and is soldered to the rims 1 at its opposite ends. Likewise, the bridge 2 is soldered to the rims 1 at its opposite ends. FIG. 2 shows a three-piece bridge structure comprising a joint 8 and a pair of arms 9a and 9b. The joint 8 is tubulous, and the tubulous member 8 has a relatively large diameter hollow section and a relatively small diameter hollow section. Thus, an annular stepwise transition 12 appears from the relatively large diameter hollow section to the relatively small diameter hollow section.

Each arm 9a or 9b has an enlarged head 10 or 11 at its end. The enlarged head 11 can be inserted in the relatively large diameter hollow section of the tubulous member 8, but it is larger than the relatively small diameter hollow section of the tubulous member 8. Thus, the enlarged head 11 of the arm 9b is caught by the annular stepwise transition 12, thus preventing the slipping-off of the arm 9b from the tubulous member 8 whereas the enlarged head 10 of the arm 9a is inserted and soldered to the relatively large diameter hollow section of the tubulous member 8.

Thus, the arms 9a and 9b can rotate relative to each other, but cannot slip off from the tubulous member 8. As seen from FIG. 2, the enlarged end of the arm 9a is integrally connected to the joint 8 by soldering thereto. The tip of the enlarged end 10 has a small projection 18 to leave the annular space 19 between the relatively large diameter hollow section of the tubulous member 8 and the small projection 18 of the enlarged end 10. The annular space 19 thus formed serves as a sink for overflowing soldering material, thereby keeping the adjacent portions clean of soldering material.

The L-shaped arms 9a and 9b rotate relative to each other, thereby permitting the rims 1 to yieldingly twist when external force is applied to the frame.

Figure 3:
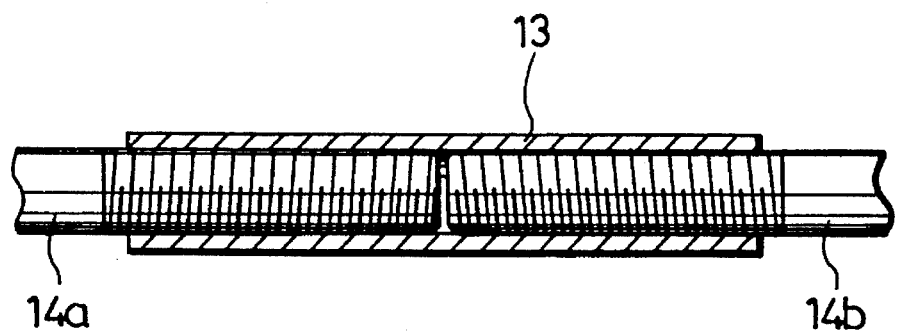
FIG. 3 is a longitudinal section of a three-piece bridge structure according to a second embodiment of the present invention.

FIG. 3 shows another bridge structure comprising a tapped tube 13 having threads formed inside and two threaded arms 14a and 14b. Each arm 14a or 14b has threads formed at its end, and is threadedly engaged with the tubulous joint 13. Thanks to the thread engagement between the joint 13 and the arms 14a and 14b these arms 14a and 14b are rotatable relative to each other, but not separable from each other.

Figure 4:
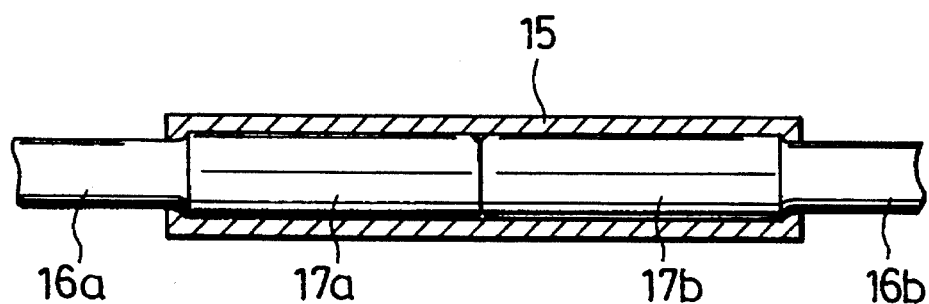
FIG. 4 is a longitudinal section of a three-piece bridge structure according to a third embodiment of the present invention.

FIG. 4 shows still another bridge structure comprising a tubulous joint 15 and two arms 16a and 16b. Each arm 16a or 16b has a somewhat enlarged end 17a or 17b. These arms 16a and 16b are inserted in the tubulous joint 15, and the opposite ends of the tube 15 are caulked around the enlarged ends 17a and 17b of the arms 16a and 16b. In place of caulking annular collars may be fixed to the opposite ends of the tube 15.

Figure 5:
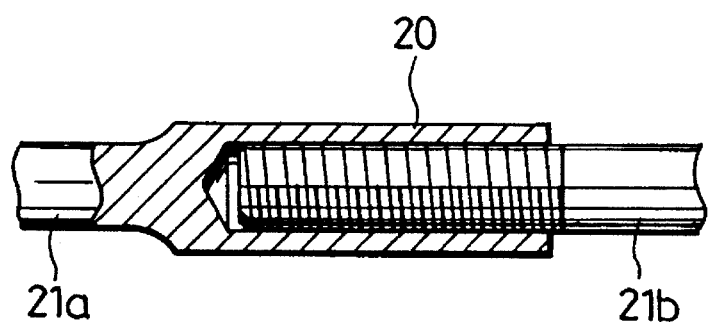
FIG. 5 is a longitudinal section of a two-piece bridge structure according to a fourth embodiment of the present invention.

FIG. 5 shows a two-piece bridge structure comprising an arm-and-tapped tube body and another threaded arm 21b. Specifically the tubulous joint 20 is integrally connected to one arm 21a, and the joint 20 has threads formed inside, and threadedly engaged with another arm 21b. Alternatively the tubulous joint may have no threads formed inside, and the arm 21b may have an enlarged end. The arm 21b may be rotatably connected to the tubulous joint 20 by caulking its open edge around the enlarged head of the arm 21b like the bridge structure of FIG. 4.

As may be understood from the above, the rotatable bridge permits a double-joint frame to yielding twist when exterior force is applied thereto, and to restore to its original shape like a frame of shape memory alloy or super resilient material when the exterior force is removed. The flexible frame may be made of stainless steel and other materials, which are much less expensive than shape memory alloy or super resilient material.

We claim:

1. A bridge structure of spectacles frame, which frame has a bridge and a transverse piece both connecting two rims side by side, characterized in that said bridge comprises a joint piece and opposite arms, each arm being fixed to one or the other rim at one end, and being fixed to the joint piece at the other end so as to permit the arms to rotate relative to each other but prevent them from being separate off from each other; and wherein the joint piece is a tubulous member having a relatively large diameter hollow section and a relatively small diameter hollow section and a relatively small diameter hollow section with an annular stepwise transition appearing therebetween;

one arm has an expanded end large enough to be cause by the annular stepwise transition in the tubulous member, thus preventing the slipping-off of the one arm from the joint piece, and permitting rotation of the one arm in the tubulous member;

and the other arm is inserted in and soldered to the relatively large diameter end of the tubulous member.

2. A bridge structure of spectacles frame, which frame has a bridge and a transverse piece both connecting two rims side by side, characterized in that said bridge comprises a joint piece and opposite arms, each arm being fixed to one or the other rim at end, and being fixed to the joint piece at the other end so as to permit the arms to rotate relative to each other but prevent them from being separate off from each other; and wherein one arm is connected integrally to one end of the joint piece.

\* \* \* \* \*